United States Patent [19]

Omure et al.

[11] Patent Number: 5,346,645
[45] Date of Patent: Sep. 13, 1994

[54] DESICCANT COMPOSITION AND A METHOD OF DESICCATING ARTICLES

[75] Inventors: Yukio Omure; Satoshi Ide; Takahiro Matsuda; Hirokaza Aoyama; Eiji Seki, all of Settsu, Japan

[73] Assignee: Daikin Industries, Ltd., Osaka, Japan

[21] Appl. No.: 889,364

[22] Filed: May 28, 1992

[30] Foreign Application Priority Data

May 28, 1991 [JP] Japan ................. 3-123803

[51] Int. Cl.$^5$ ............................. C09K 3/18
[52] U.S. Cl. ..................... 252/194; 252/364
[58] Field of Search ................. 252/194, 364

[56] References Cited

U.S. PATENT DOCUMENTS

| 3,397,150 | 8/1968 | Burt et al. | 252/194 |
| 5,064,559 | 11/1991 | Merchant et al. | 252/194 |
| 5,064,560 | 11/1991 | Merchant | 252/171 |
| 5,076,956 | 12/1991 | Anton | 252/364 X |
| 5,087,386 | 2/1992 | Omure et al. | 252/194 |
| 5,100,572 | 3/1992 | Merchant | 252/171 |

FOREIGN PATENT DOCUMENTS

| 0386346 | 9/1990 | European Pat. Off. |
| 0431458 | 6/1991 | European Pat. Off. |
| 03252500 | 3/1990 | Japan. |
| 2188059 | 9/1987 | United Kingdom. |

Primary Examiner—Robert L. Stoll
Assistant Examiner—Valerie Fee
Attorney, Agent, or Firm—Larson and Taylor

[57] ABSTRACT

The invention provides a desiccant composition comprising an alcohol and a fluorinated aliphatic hydrocarbon compound of the general formula $$C_nF_mH_{2n+2-m}$$

wherein m and n each is a positive integer satisfying the relations: $4 \leq n \leq 6$ and $2n-2 \leq m < 2n+2$, and a method of desiccating an article with said desiccant composition.

7 Claims, 1 Drawing Sheet

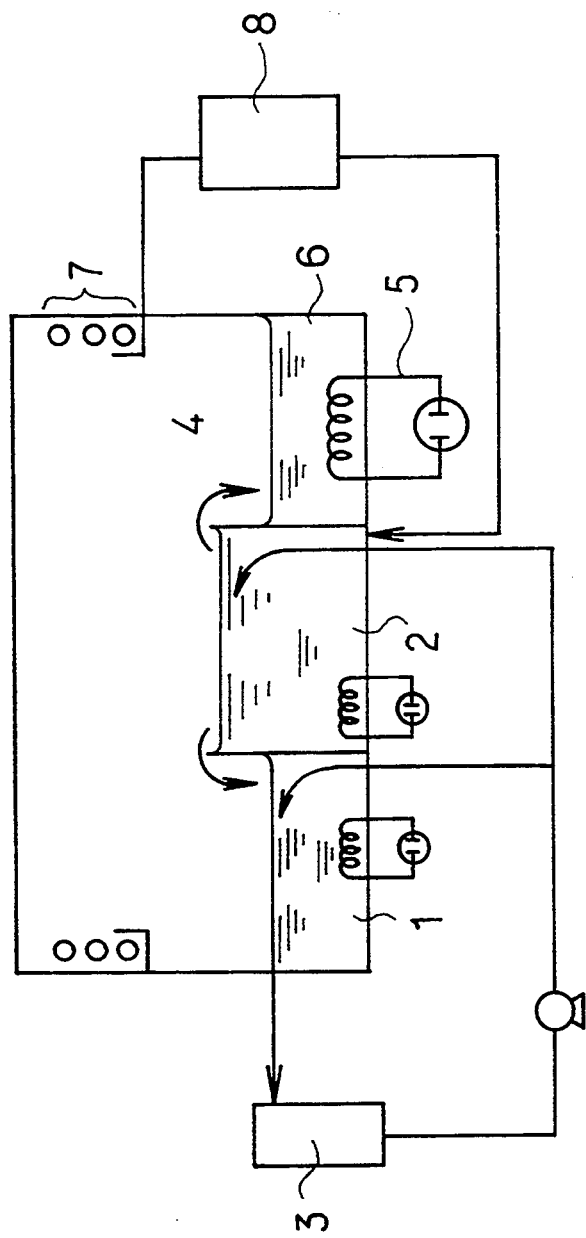

DESICCANT COMPOSITION AND A METHOD OF DESICCATING ARTICLES

BACKGROUND ART

The present invention relates to a desiccant composition and a method of desiccating articles with the desiccant composition.

Throughout this specification and appended claims, % stands for percent by weight and the term 'desiccation', inclusive of its derivative terms, means removal of surface water from any article and is synonymous with drying and dehydration.

Wafers for the fabrication of semiconductor devices such as IC and LSI, plated articles, optical lenses, photolithographic masks, liquid display device components, electronic parts and various other parts made of metal, plastic, glass or/and ceramic materials (all referred to collectively as an article) are rinsed and, then, dehydrated in various intermediate stages of fabrication or at the final stage in the production process. Typically an article is rinsed with an aqueous detergent solution and demineralized water and, then, dehydrated. The residual water on the surface of an article can be a source of stain or rust and, as such, is an important parameter determinant of the field performance of the article.

For the effective dehydration of an article, it is common practice to use an alcohol, e.g. isopropyl alcohol or ethanol, a chlorofluorocarbon (CFC), e.g. trichlorotrifluoromethane, or a composition comprising such a chlorofluorocarbon (CFC), an alcohol and a surfactant.

However, isopropyl alcohol and ethanol are not satisfactory from workability points of view because they are highly inflammable to cause hazards. CFCs, mentioned above, destroy the ozone layer of the stratosphere so that, as frequently pointed out, they may exert serious adverse effects on the ecology of the earth, involving humans as well. Therefore, as far as the CFCs with a high risk of destroying the ozonosphere are concerned, both use and production have been restricted by international agreements.

SUMMARY OF THE INVENTION

The object of the present invention is to provide a novel desiccant composition and a method of desiccating an article with the desiccant composition.

The inventor of the present invention explored this realm of technology against the foregoing background and found that a composition comprising a defined fluorinated aliphatic hydrocarbon compound and a defined alcohol exhibits excellent performance characteristics in the elimination of water from the surface of an article.

Therefore, the present invention provides
a desiccant composition comprising an alcohol containing 1 to 4 carbon atoms and a fluorinated aliphatic hydrocarbon compound of the general formula $$C_nF_mH_{2n+2-m}$$

wherein m and n each represents a positive integer satisfying the relations: $4 \leq n \leq 6$ and $2n-2 \leq m < 2n+2$, and
a method of desiccating an article which comprises contacting the article with the above desiccant composition to thereby remove surface water from the article.

BRIEF DESCRIPTION OF THE DRAWINGS

FIG. 1 is a sectional view showing a typical desiccating device for use in practicing the method of the invention. As illustrated, a first dip tank is indicated at 1, a second dip tank at 2, a water separator at 3, a vapor zone at 4, a heater unit at 5, a vapor tank at 6, a cooling pipe at 7, and a condensate tank at 8.

DETAILED DESCRIPTION OF THE INVENTION

The fluorinated aliphatic hydrocarbon compound that can be employed in accordance with the invention includes the following, among others.

$C_4F_6H_4$, $C_4F_8H_2$, $C_4F_9H$, $C_5F_8H_4$, $C_5F_9H_3$, $C_5F_{10}H_2$, $C_5F_{11}H$, $C_6F_{10}H_4$, $C_6F_{11}H_3$, $C_6F_{12}H_2$ and $C_6F_{13}H$.

Examples of the fluorinated aliphatic hydrocarbon compounds include 1,1,2,3,4,4-hexafluorobutane, 2-methyl-1,1,1,3,3,3-hexafluoropropane, 1,2,2,3,3,4-hexafluorobutane, 1,1,1,2,3,3,4-heptafluorobutane, 1,1,2,2,3,4,4-heptafluorobutane, 1,1,1,2,3,4,4,-heptafluorobutane, 1,1,2,2,3,3,4-heptafluorobutane, 1,1,1,2,2,3,3,4-octafluorobutane, 1,1,1,2,2,3,3,4-octafluorobutane, 1,1,2,2,3,3,4,4-octafluorobutane, 1,1,1,2,2,3,3,4,4-nonafluorobutane, 1,1,1,2,2,3,4,4,4-nonafluorobutane, 1,1,1,2,3,3,4,4,5-nonafluoropentane, 1,1,1,2,2,4,5,5,5-nonafluoropentane, 1,1,1,2,2,3,5,5,5-nonafluoropentane, 1,1,2,3,3,4,5,5-octafluoropentane, 1,1,1,2,2,5,5,5-octafluoropentane, 1,1,2,2,3,3,4,4,5-nonafluoropentane, 1,1,1,2,3,3,4,4,5,5-decafluoropentane, 1,1,1,2,2,3,3,4,5,5-decafluoropentane, 1,1,1,2,2,3,4,5,5,5-decafluoropentane, 1,1,1,2,2,4,4,5,5,5-decafluoropentane, 1,1,1,2,2,3,3,4,4,5,5-undecafluoropentane, 1,1,1,2,2,3,3,4,4,5,5,-undecafluoropentane, 1,1,2,2,3,3,4,4,5,5,6,6-dodecafluorohexane, 1,1,1,2,2,5,5,6,6,6-decafluorohexane, 2-trifluoromethyl-1,1,1,2,4,4-hexafluorobutane, 2-trifluoromethyl-1,1,1,2,3,3,4,4-octafluorobutane, 2-trifluoromethyl-1,1,1,3,4,5,5-heptafluoropentane, 2-trifluoromethyl-1,1,1,2,3,4,5-heptafluoropentane, 2-trifluoromethyl-1,1,1,3,4,5,5,5-octafluoropentane, 2-trifluoromethyl-1,1,1,2,3,4,5,5-octafluoropentane, 2-trifluoromethyl-1,1,1,2,3,5,5,5-octafluoropentane, 2-trifluoromethyl-1,1,1,3,4,4,5,5-nonafluoropentane, 2-trifluoromethyl-1,1,1,2,3,4,5,5-nonafluoropentane, 1,1,1,2,2,3,3,4,4,5,5,6,6-tridecafluorohexane and 1,1,1,2,2,3,3,4,4,5,6,6,6-tridecafluorohexane. Preferred compounds, among them, are 1,1,1,2,2,3,3,4-octafluorobutane, 1,1,2,2,3,3,4,4-octafluorobutane, 1,1,1,2,3,3,4-octafluorobutane, 1,1,1,2,3,3,4,4,5-decafluoropentane, 1,1,1,2,2,3,3,4,5,5-decafluoropentane, 1,1,1,2,2,4,4,5,5,5-decafluropentane, and 2-trifluromethyl-1,1,1,2,3,4,5,5,5-nonafluoropentane. More preferred compounds, among them, are 1,1,1,2,2,3,3,4-octafluorobutane, 1,1,1,2,2,4,4,5,5,5-decafluoropentane and 2-trifluoromethyl-1,1,1,2,3,4,5,5,5-nonafluoropentane. These compounds can be used alone or as a mixture of two or more species.

The alcohol containing 1 to 4 carbon atoms, which is used in admixture with the above-mentioned fluorinated aliphatic hydrocarbon compound, includes methanol, ethanol, i-propanol, n-propanol, i-butanol, sec-butanol and tert-butanol, among others. In addition, such fluorinated alcohols as 2,2,2-trifluoroethanol, 2,2,3,3-tetrafluoropropanol, 2,2,3,3,3-pentafluoropropanol, etc. can

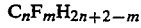

also be employed. Among these alcohols, methanol, ethanol, i-propanol, n-propanol and pentafluoropropanol are preferred, and methanol, ethanol, i-propanol and n-propanol are more preferred. These alcohols can be used alone or as a mixture of two or more species.

The preferred desiccant composition of the invention meets the following criteria.

(1) To be hardly inflammable or nonflammable to insure working safety;
(2) Boiling at a temperature within the range of 40° to 80° C. This is preferred from performance points of view;
(3) Water solubility being within the range of 0.1 to 3%, preferably 0.1 to 2%. If the solubility is less than 0.1%, the efficiency of dehydration will be insufficient. Conversely if the solubility exceeds 3%, the dissolution of water-soluble contaminants will increase to leave stains after removal of water.

To meet the above criteria, the proportions of a fluorinated aliphatic hydrocarbon compound to alcohol, which are of course dependent on the water solubilities of the two components employed, are generally such that the composition contains about 25% or less, preferably 3 to 15%, of the alcohol and is more preferably such that the two components form an azeotropic mixture or an azeotrope-like mixture (a mixture which is not an azeotropic mixture in the strict sense but a mixture showing a constant boiling temperature and a constant composition). If the proportion of the alcohol exceeds about 25%, the amount of water that can be dissolved in the composition will exceed about 3% and this means that the dissolution of water-soluble contaminants is assisted to increase the incidence of stain and, at the same time, the composition will become easily inflammable. Conversely, if the proportion of the alcohol is less than 3%, the solubility of water in the desiccant composition will not be more than 0.1%, with the result that the affinity of the composition for the surface water of an article is decreased to compromise the dehydrating performance of the composition.

Where necessary, the desiccant composition of the invention may contain any known additives that are commonly incorporated in compositions of this type for various purposes. Among such additives are auxiliary dehydrating agents such as surfactants, stabilizers, hydrogen-containing chlorofluorinated hydrocarbons with low potentials to destroy the ozonosphere, and hydro-carbons which do not destroy the ozonosphere.

The specific procedure of removing surface water from an article with the above desiccant composition comprises contacting the article with the desiccant composition. Such contact can be achieved by various techniques, e.g. by dipping the article in the desiccant composition, by spraying the article with the desiccant composition, by contacting the article with the vapor of the desiccant composition, by dipping the article in the desiccant composition and then contacting it with the vapor of the composition, and by spraying the article with the desiccant composition and further contacting it with the vapor of the composition. It is generally recommended that the desiccant composition of the invention should be used at an elevated temperature of about 40° C. to its boiling temperature and preferably about 40° C. to a temperature about 5° C. lower than the boiling temperature. The dehydrating power of the composition is decreased at temperatures below 40° C. For improving the dehydrating effect of the procedure comprising contacting the article bearing surface water with the desiccant composition, certain adjunct means such as tumbling, ultrasonication, etc. can be employed.

For the removal of surface water from an article with the desiccant composition of the invention, the same equipment and the same procedure can be employed as those used for the conventional chlorofluorocarbon type or other desiccant composition. While there is, thus, no limitation on the equipment and procedure, the system illustrated by way of example in FIG. 1 may be employed with advantage.

Referring to FIG. 1 which is a schematic sectional view showing an exemplary desiccating device for use in the desiccating method of the invention, an article bearing surface water (not shown) is first dipped in the desiccant composition of the invention in a first dip tank 1 equipped with a heater unit, where a substitution of the composition for water takes place. The water thus leaving the article floats up on the surface of the desiccant composition due to a difference in specific gravity.

When the article demands a sophisticated degree of dehydration, the article which has been dipped in the first dip tank 1 is transferred to a second dip tank 2 provided with heater means, where it is dipped in the desiccant composition of the invention again, whereby the desired high degree of dehydration can be accomplished. The desiccant composition overflowing the first dip tank 1 and having been substantially deprived of water by a water separator 3 and the desiccant composition reclaimed by condensation of the ascending vapor of the composition in a vapor tank 6 and substantially capable of dehydration are recycled to said second dip tank 2.

When a still higher degree of dehydration is necessary, the article which has passed through a dipping process in the second dip tank 2 is transferred to a vapor zone 4 disposed overhead said vapor tank 6 equipped with heater unit 5. In this zone 4 the article is contacted with the vapor of the desiccant composition for further removal of water. Disposed above the vapor zone 4 is a cooling pipe 7 where the ascending vapor of the desiccant composition is condensed and the resulting condensate which is substantially capable of dehydration drips down into a condensate tank 8.

There is no limitation of the type of said water separator 3 and the process of dehydration involved but any device and procedure that are capable of separating water can be employed. For example, the method comprising cooling the desiccant composition to separate water, the method for separating water from the desiccant composition by distillation and the method of separating water by means of an pervaporation membrane and the corresponding devices for practicing these methods can be employed.

Shown in FIG. 1 is a dehydrating system in which an article is dehydrated with an equipment having two dip tanks and one vapor tank. However, any other systems can likewise be employed. For example, according to the amount of surface water, the required degree of dehydration, and the ease of separation of water from the article, the equipment may simply comprise one dip tank or one vapor tank, or one dip tank and one vapor tank. Dehydration by a spray device is also feasible.

The desiccant composition of the invention will not cause environmental problems such as destruction of the ozonosphere.

Furthermore, the desiccant composition of the invention is quite outstanding in the elimination of surface water from an article.

Moreover, the desiccant composition is hardly inflammable or nonflammable and, therefore, advantageous in handling.

Unlike i-propanel and ethanol, the desiccant composition can be easily separated from water by reducing its temperature.

The desiccant composition has an ability to readily separate the water contained therein so that the water can be easily removed from the desiccant composition and the loss of the composition is reduced. The desiccant composition is not liable to adversely affect the article.

Furthermore, the desiccant composition consisting in an azeotropic mixture or a an azeotrope-like mixture is easy in management. Needless to say, repeated evaporation and condensation for recovery and reuse does not substantially alter the proportions of the components.

The following example is intended to illustrate the invention in further detail.

EXAMPLE 1

A glass sheet (50 mm×50 mm×1 mm) previously cleaned and bearing surface water was subjected to desiccation treatment as shown in Table 1. The desiccant compositions used are shown in Table 2.

The dehydrated glass sheet was then dipped in a predetermined quantity of dry methanol and the gain in the water content of the methanol after dipping was measured by the Karl-Fischer method. The amount of water thus determined was expressed as "$W_1$".

On the other hand, a glass sheet (50 mm×50 mm×1 mm) cleaned and bearing surface water was not subjected to dehydration treatment with the desiccant composition but directly to dipping treatment in a predetermined quantity of dry methanol and the gain in water content of the methanol after dipping was measured by the Karl-Fischer method. The amount of water thus determined was expressed as "$W$".

Then, the percent dehydration H (%) was calculated by means of the following equation.

$$H(\%) = (W - W_1)/W \times 100$$

The percent dehydration values for various combinations of desiccant compositions with dehydrating procedures are shown in Table 3. All the treatments made for determinations were carried out at room temperature.

TABLE 1

| Dehydrating procedure | |
|---|---|
| A | Dip (bath temperature 40° C.) 1 minute plus vapor treatment 1 minute |
| B | Dip (boiling bath) 1 minute plus vapor treatment 1 minute |
| C | Spray (liquid temperature 40° C.) 1 minute plus vapor treatment 1 minute |
| D | Vapor treatment 1 minute |
| E | Dip (bath temperature 40° C.) 1 minute |
| F | Dip (boiling bath) 1 minute |

TABLE 2

| Composition No. | | |
|---|---|---|
| 1 | $CF_3CF_2CF_2CH_2F$/ethanol | 94/6 |
| 2 | $HCF_2CF_2CF_2CF_2H$/methanol | 97/3 |
| 3 | $CF_3CF_2CH_2CF_2CF_3$/ethanol | 92/8 |
| 4 | $(CF_3)_2CFCFHCFHCF_3$/ethanol | 90/10 |
| 5 | $CF_3CF_2CFHCFHCF_3$/ethanol | 95/5 |
| 6 | $(CF_3)_2CFCFHCFHCF_3$ | 100 |
| 7 | Ethanol | 100 |
| 8 | $CCl_2FCClF_2$/ethanol | 96/4 |

TABLE 3

| Dehydrating Procedure Composition No. | Percent desiccation | | | | | |
|---|---|---|---|---|---|---|
| | A | B | C | D | E | F |
| 1 | 96 | 97 | 98 | 90 | 92 | 96 |
| 2 | 94 | 95 | 96 | 90 | 92 | 94 |
| 3 | 97 | 97 | 99 | 91 | 93 | 97 |
| 4 | 97 | 99 | 99 | 91 | 93 | 97 |
| 5 | 88 | 89 | 90 | 80 | 85 | 88 |
| 6 | ≧10 | ≧10 | ≧10 | ≧10 | ≧10 | ≧10 |
| 7 (Note) | 99 | 99 | 99 | 98 | 99 | 98 |
| 8 | 96 | 98 | 99 | 90 | 94 | 97 |

Note: The glass surface is invariably stained.

Evaluation Test

1) Water separation test 30 ml of each composition listed in table 2 and 30 ml of water placed in 100 ml flask with a stopper were vigorously shaken for 30 seconds and left to stand. The time was measured until the white hazy liquid was separated to two complete transparent layers.

Each sample was evaluated according to the following scale:

| Rank | Separation Time |
|---|---|
| A | within 10 mins |
| B | within 1 hour |
| C | over 1 hour |

Table 4 shows the results.

In the water separation test, the compositions which tend to separate the water from the mixture are superior in that the water once removed from an article is difficult to return to the surface of the article.

(2) Durability of substrates

Into a 100 ml glass bottle containing 50 ml of each composition listed in table 2 were placed resin pieces (ABS, polyacrylate and polycarbonate, 5×50×2 mm) and the contents were heated at 50° C. for 4 hours.

Visual appearance and weight change before and after the test were checked and evaluated according to the following scale.

Rank A: no appearance change and weight change of less than 5%
Rank B: no appearance change and weight change of less than 10%
Rank C: dissolved or cracked The results are shown in Table 4.

TABLE 4

| Composition No. | Water separation | Durability of substarate | | |
|---|---|---|---|---|
| | | ABS | Polyacrylate | PC |
| 1 | A | A | A | A |
| 2 | A | A | A | A |
| 3 | A | A | A | A |

TABLE 4-continued

| Composition No. | Water separation | Durability of substarate | | |
|---|---|---|---|---|
| | | ABS | Polyacrylate | PC |
| 4 | A | A | A | A |
| 5 | B | A | A | A |
| 6 | A | A | A | A |
| 7 | dissolved | B | C | A |
| 8 | A | A | A | A |

We claim:

1. A desiccating method for removing surface water from an article which comprises contacting the article with a desiccant composition comprising at least one fluorinated aliphatic 1,1,2,3,4,4-hexafluorobutane, 2-methyl-1,1,1,3,3,3-hexafluoropropane, 1,2,2,3,3,4-hexafluorobutane, 1,1,1,2,3,3,4-heptafluorobutane, 1,1,2,2,3,4,4-heptafluorobutane, 1,1,2,3,4,4-heptafluorobutane, 1,1,2,2,3,3,4-heptafluorobutane, 1,1,1,2,3,3,4,4-octafluorobutane, 1,1,1,2,2,3,3,4-octafluorobutane, 1,1,2,2,3,3,4,4-octafluorobutane, 1,1,1,2,2,3,3,4,4-nonafluororbutane, 1,1,1,2,2,3,4,4,4-nonafluorobutane, 1,1,2,3,3,4,5,5-octafluoropentane, 1,1,1,2,2,5,5,5-octafluoropentane, 1,1,1,2,2,3,3,4,4,5,5-undecafluoropentane, 1,1,1,2,2,3,3,4,5,5,5-undecafluoropentane, 1,1,2,2,3,3,4,4,5,5,6,6-dodecafluorohexane, 1,1,1,2,2,5,5,6,6,6-decafluorohexane, 2-trifluoromethyl-1,1,1,2,4,4-hexafluorobutane, 2-trifluoromethyl-1,1,1,2,3,3,4,4-octafluorobutane, 2-trifluoromethyl-1,1,1,3,4,5,5-heptafluoropentane, 2-trifluoromethyl-1,1,1,2,3,4,5-heptafluoropentane, 2-trifluoromethyl-1,1,1,3,4,5,5,5-octafluoropentane, 2-trifluoromethyl-1,1,1,2,3,4,5,5-octafluoropentane, 2-trifluoromethyl-1,1,1,2,3,5,5,5-octafluoropentane, 2-trifluoromethyl-1,1,1,2,3,4,5,5,5-nonafluoropentane, 1,1,1,2,2,3,3,4,4,5,5,6,6-tridecafluorohexane and 1,1,1,2,2,3,3,4,4,5,6,6,6-tridecaflurorohexane, and 3 to 25% by weight, based on the weight of the composition, of at least one alcohol selected from the group consisting of methanol, ethanol, i-propanol, n-propanol, i-butanon, sec-butanol, tert-butanol, 2,2,2-trifluoroethanol, 2,2,3,3-tetrafluoropropanol, and 2,2,3,3,3,-pentafluoropropanol.

2. The desiccating method of claim 1 which comprises dipping said article in said desiccant 3. The desiccating method of claim 1 which comprises spraying said article with said desiccant composition at a temperature of about 40° C. to the boiling temperature of the composition.

4. The desiccating method of claim 1 which comprises contacting said article with the vapor of said desiccant composition.

5. The desiccating method of claim 1 which comprises dipping said article in said desiccant composition maintained at a temperature between 40° C. and the boiling temperature of the composition and, then, contacting the same article with the vapor of said desiccant composition.

6. The desiccating method of claim 1 which comprises spraying said article with said desiccant composition at a temperature of about 40° C. to the boiling temperature of the composition and, then, contacting the same article with the vapor of said desiccant composition.

7. The desiccating method of claim 1 wherein said alcohol is present in an amount of from 3 to 15% by weight of the composition.

* * * * *